United States Patent
Singh et al.

(10) Patent No.: US 11,356,499 B1
(45) Date of Patent: Jun. 7, 2022

(54) UNIVERSAL DOMAIN PROXY FOR SAS

(71) Applicant: CHARTER COMMUNICATIONS OPERATING, LLC, St. Louis, MO (US)

(72) Inventors: Lakhbir Singh, Aurora, CO (US); Umamaheswar Kakinada, Centennial, CO (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 0 days.

(21) Appl. No.: 17/320,405

(22) Filed: May 14, 2021

(51) Int. Cl.
| | |
|---|---|
| H04L 27/26 | (2006.01) |
| H04W 16/14 | (2009.01) |
| H04W 16/18 | (2009.01) |
| H04L 67/10 | (2022.01) |
| H04W 72/04 | (2009.01) |

(52) U.S. Cl.
CPC .......... *H04L 67/10* (2013.01); *H04W 72/0453* (2013.01)

(58) Field of Classification Search
CPC ..... H04L 67/10; H04L 67/145; H04L 5/0032; H04L 5/0058; H04W 72/0453; H04W 72/044; H04W 72/048

USPC ........................................................ 709/217
See application file for complete search history.

(56) References Cited

U.S. PATENT DOCUMENTS

| | | | |
|---|---|---|---|
| 10,340,976 B2 | 7/2019 | Kakinada et al. | |
| 2016/0212624 A1* | 7/2016 | Mueck ................. | H04W 72/10 |
| 2019/0058999 A1* | 2/2019 | Gunasekara ...... | H04W 36/0022 |
| 2019/0373615 A1 | 12/2019 | Cimpu et al. | |
| 2020/0236557 A1 | 7/2020 | Richardson et al. | |
| 2021/0176724 A1* | 6/2021 | Mueck ................. | H04W 60/02 |
| 2021/0368349 A1* | 11/2021 | Bandyopadhyay ... | H04W 16/10 |
| 2021/0368565 A1* | 11/2021 | Wu ...................... | H04L 1/1851 |
| 2021/0400680 A1* | 12/2021 | Beck .................... | H04W 72/10 |
| 2022/0007199 A1* | 1/2022 | Mahalingam ......... | H04W 16/14 |
| 2022/0022049 A1* | 1/2022 | Park ..................... | H04W 76/25 |

FOREIGN PATENT DOCUMENTS

| | | | | |
|---|---|---|---|---|
| WO | WO-2017139206 A1 * | 8/2017 | ............ | H04W 16/14 |
| WO | 2019226172 A1 | 11/2019 | | |

* cited by examiner

*Primary Examiner* — Ruolei Zong
(74) *Attorney, Agent, or Firm* — Meagher Emanuel. Laks Goldberg & Liao, LLP.

(57) ABSTRACT

Various embodiments comprise systems, methods, architectures, mechanisms and apparatus providing a universal SAS domain proxy.

25 Claims, 3 Drawing Sheets

UNIVERSAL DOMAIN PROXY FOR SAS

FIELD OF THE DISCLOSURE

The present disclosure generally relates to wireless communications systems and related networks, and more particularly to a domain proxy supporting SAS access by multiple types of CBSDs.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Operators of mobile systems, such as 5th Generation New Radio (5G-NR) as described in various documents of the Third Generation Partnership Project (3GPP), are increasingly relying on wireless macrocell radio access networks (RANs) such as traditional cellular base stations, eNBs and the like, along with wireless small cell or microcell RANs in order to deploy, for example, indoor voice and data services to enterprises and other customers. For both macrocell RANs and small/micro cell RANs, increasing demands for wireless throughput make access to additional spectrum desirable, including both licensed and unlicensed spectrum.

Unlicensed spectrum may comprise, illustratively, the Citizens Broadband Radio Service (CBRS) band at ~3.5 GHz which is utilized by Citizens Broadband Radio Service Devices (CBSDs) registered with a Spectrum Access System (SAS) capable of adapting CBSD operation in accordance with the Generic Authorized Access (GAA) requirements, network congestion, network interference and the like. The SAS performs various functions such as determining/assigning frequencies, operating parameters (e.g., transmission power on those frequencies), and the like to CBSDs such as within a mobile network.

Each of the CBSDs may connect to the SAS via a domain proxy, which aggregates SAS messaging from multiple CBSDs and hides network topology and other information from external networks, including the SAS. While the domain proxy interface towards the SAS is defined, the domain proxy interface toward the CBSDs is source-specific, which becomes problematic for mobile systems operators deploying CBSD from multiple vendors (since each vendor uses its own domain proxy, and each domain proxy uses a proprietary CBSD interface) or where CBSD internet access is constrained (i.e., CBSDs cannot directly access the SAS).

SUMMARY

Various deficiencies in the prior art are addressed by systems, methods, architectures, mechanisms and apparatus providing a universal SAS domain proxy.

In one embodiment, a method comprise: receiving, at a domain proxy, a Citizens Broadband Radio Service Device (CBSD) message intended for a spectrum access server (SAS) and including a source identification associated with a requesting CBSD from a diverse group of CBSDs; identifying, using the source identification, a source-specific interface adaptor configured for enabling the domain proxy to support communications between the requesting CBSD and the SAS; retrieving the identified source-specific interface adaptor from a domain proxy adaptor library associated with the domain proxy; instantiating, at the domain proxy, the retrieved source-specific interface adaptor; and forwarding toward the SAS, from the domain proxy, the received CBSD message.

In one embodiment, a domain proxy comprises: a receiver configured to receive Citizens Broadband Radio Service Device (CBSD) messages intended for a spectrum access server (SAS) and including a source identification associated with a requesting CBSD; a processor configured to identify, using the source identification, a source-specific interface adaptor configured for enabling the domain proxy to support communications between the requesting CBSD and the SAS; the processor being further configured to retrieve, from a domain proxy adaptor library associated with the domain proxy, the identified source-specific interface adaptor, and to instantiate the retrieved source-specific interface adaptor; and an SAS interface configured for enabling the domain proxy to communicate with the SAS.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
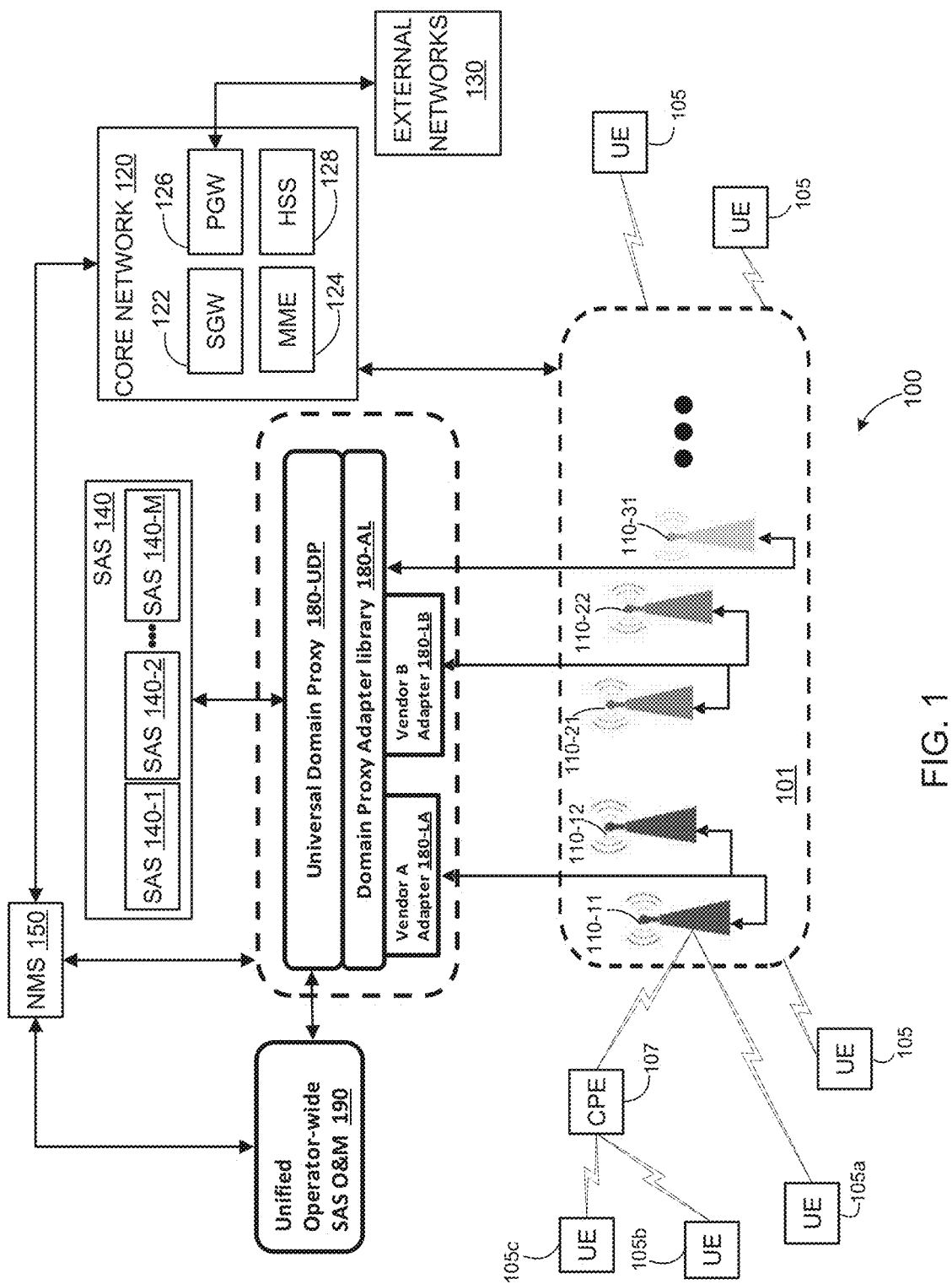
FIG. 1 depicts a block diagram of a network architecture benefiting from the various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments provide a universal domain proxy configured to provide domain proxy services between a Spectrum Access System (SAS) and a heterogeneous group, network or domain having deployed therein Citizens Broadband Radio Service Devices (CBSD) from diverse sources (e.g., different vendors, manufacturers and the like). Advantageously, the disclosed a universal domain proxy (UDP) replaces multiple domain proxies connecting respective vendor groups of CBSDs to an SAS with a single domain proxy having source-specific adaptors for each vendor's CBSDs (i.e., a standard interface toward the SAS, with CBSD facing APIs to support source-specific interfaces). When a CBSD connects to the UDP, the sorcerer vendor is identified and the correct interface is retrieved and invoked for that CBSD.

Generally speaking, the universal domain proxy provides various services/functions, such as hiding the network topology beyond the proxy, various security enhancement, transport protocol resiliency/adaptation (IPv4/IPV6), reduced complexity management and troubleshooting functions, reduced complexity integration of new CBSD devices, operator flexibility by enabling the use of CBSDs from multiple vendors, optimizing costs across multiple SAS vendors, and so on.

Further embodiments provide unified SAS operations and maintenance (O&M) services, such as within or associated with a network management system (NMS) 150, where the unified SAS O&M services enable a network operator having one or more heterogeneous or diverse sources CBSD deployments to manage such deployment in a unified manner without the need for source-specific O&M services such that a unified operator wide SAS O&M capability is provided.

Advantageously, these and further embodiments enable a network operator to more precisely manage and/or optimize the mobile network, such as by simplifying the re-allocation/sharing of acquired spectrum resources among CBSDs of differing sources/vendors, more tightly integrating CBSDs and other elements of the group, network or domain (e.g., improving optimization/troubleshooting), and supporting CBSDs lacking internet access (i.e., lacking a direct path to the SAS).

FIG. 1 depicts a block diagram of a network architecture benefiting from the various embodiments. Specifically, the network architecture 100 of FIG. 1 as depicted includes a wireless access network 101 comprising a plurality of deployed network nodes 110 configured to wirelessly communicate with, and provide backhaul services to, user equipment (UE) 105 and/or other devices.

It is noted that the deployed network nodes 110 forming the access network 101 may comprise CBSD nodes or a mix of CBSD and non-CBSD nodes. Further, while primarily depicted and described within the context of mobile access technologies (e.g., 4G/LTE/5G access network technologies and an evolved packet core), in various embodiments the underlying access network topologies supported by the various network nodes 110 may further or alternately comprise Wi-Fi access network technologies (e.g., 802.11xx or other Wi-Fi protocols).

It is further noted that the access network 101 and core network 120 may comprise any type of access or core network or network technology. As depicted in FIG. 1, the network nodes 110 of the access network 101 are depicted as being connected to a core network comprising, illustratively, an evolved packet core (EPC) 120 of a 4G/LTE network. It will be appreciated that the various embodiments are not limited to this type of network. Specifically, the various embodiments are suitable for use within the context of any type of core or access network, such as 3G/4G/LTE/5G networks and the like, wherein proprietary CBSD devices may be used/configured to provide network services thereto, such as from/to external networks 130. It will be appreciated that additional mobile networks, fixed wireless access networks, domains, groups, and/or other or additional deployments of network nodes as described herein are also contemplated in various embodiments.

The network nodes 110 may include those that use (or are compatible with) mobile network protocols to communicate with UE 105 via unlicensed spectrum, such as may be implemented as macrocells, small cells, microcells and the like such as eNodeBs (eNBs), cellular network base stations, 4G/LTE or 5G repeaters, and similar types of provider equipment (PE) or logical radio nodes (e.g., gNBs) derived therefrom. The network nodes 110 may include nodes that use licensed 3G/4G/LTE/5G spectrum, unlicensed spectrum such as citizens broadband radio service (CBRS) spectrum, or a combination of licensed and unlicensed spectrum. The network nodes 110 may include mid-band (e.g., 3.5 GHz) mobile network nodes, low-band (e.g., under 1 GHz) mobile network nodes, or a combination of mid-band and low-band mobile network nodes. In the case of network nodes 110 having Citizens Broadband Radio Service Device (CBSD) capability, allocations of CBRS spectrum are provided via a Spectrum Access System (SAS) 140.

Generally speaking, the access network 101 may comprise a multi-layered network wherein network nodes 110 of differing technologies provide overlapping coverage areas such that UE having multiple radio access capability may receive network services from different layers or portions of the network (i.e., CBSD of differing technologies).

The network nodes 110 may include those that use (or are compatible with) Wi-Fi network protocols to communicate with UE 105 via unlicensed spectrum, such as may be implemented as wireless access points deployed at home, business or other locations and configured to wirelessly communicate with and provide network services to UE 105 such as via 802.11xx or other Wi-Fi protocols. Thus, in various embodiments the network nodes 110 may uses Wi-Fi protocols, mobile network protocols, or a combination thereof within the context of licensed spectrum, unlicensed spectrum, or a combination of licensed and unlicensed spectrum.

Each network node 110 provides network services to proximate UE 105 via respective radio bearer (channels/resources) which are managed by various Radio Resource Management functions, such as Radio Bearer Control, Radio Admission Control, Connection Mobility Control, Scheduling of UE/CPE in both uplink and downlink, assignment of bandwidth parts (BWPs) to UE/CPE and so on. The Radio Resource Management functions are configured to provide appropriate Quality of Service (QoS) levels to the UE/CPE using one or more radio bearers, such as to maximize throughput at the node 110 while maintaining "fairness" to the UE/CPE attached thereto, to monitor various performance metrics, to provide data to the core network or network management entities and the like.

Generally speaking, each of the CBSD and non-CBS the network nodes 110 utilizes defined defines frequency ranges (FRs), such as FR1 (~410 MHz to 7125 MHz), FR2 (~24.25 GHz to 52.6 GHz), and so on. These frequency ranges may include both licensed and unlicensed spectrum as discussed elsewhere herein, where unlicensed spectrum includes CBRS spectral regions used by CBSD network nodes 110. Each of the spectral regions includes a plurality of operating bands, wherein each operating band is a frequency band associated with a certain set of radio frequency (RF) requirements.

Each network node 110 may include a Scheduler to implement uplink/downlink scheduling functions so as to allocate radio bearer resources to attached UE in accordance with allocated frequency bands. Further, each network node 110 may provide management data such as channel/frequency utilization level, congestion level, number of connected UE, number and type of network services being provided and so on to various management entities associated with the network operator.

The UE 105 may comprise any type of wireless device configured for use in accordance with the various embodiments, such as user terminals (e.g., mobile phones, laptops, tablets and the like), fixed wireless access devices (e.g., set top boxes, digital video recorders, stationary computing devices and the like), Internet of Things (IoT) devices (e.g., sensors, monitoring devices, alarm system devices and the like), and/or other types of wireless devices capable of communicating with the network nodes 110. The UE 105 may include UE that use licensed 3G/4G/LTE/5G spectrum, unlicensed spectrum such as CBRS spectrum, or a combination of licensed and unlicensed spectrum. In the case of network nodes 110 having CBSD capability, allocations of CBRS spectrum are provided via SAS 140.

The UE 105 may be configured to communicate directly with the network nodes 110, or via customer premises equipment (CPE) 107 such as wireless routers and other devices capable of communicating with both UE 105 and network nodes 110. Further, the CPE may also comprise CBSD CPE (e.g., a micro cell or WAP) such that SAS spectrum allocation and related management functions discussed herein with respect to the network nodes 110 are also used with such CBSD CPE.

While any type of core or access network or network technology may be used, the illustrative EPC 120 is depicted in a simplified manner as including, e.g., a service gateway (SGW) 122, a packet gateway (PGW) 126, a mobility management entity (MME) 124, and a Home Subscriber Server (HSS) 128. Various other functional elements associated with a typical EPC have been omitted for simplification of the discussion. Generally speaking, the EPC 120 supports various data plane (DP) functions and control plane (CP) functions, such as transport internet protocol (IP) data traffic (incoming and outgoing packets) between the network nodes 110 and external networks 130 (e.g., so as to support the delivery of various services to User Equipment (UE) 105 attached to the network nodes 110.

The SGW 122 is a point of interconnection between the radio-side (e.g., via a backhaul connection to the access network 101) and the EPC 120, and serves the UE 105 by routing the various incoming and outgoing IP packets. The SGW 122 is the anchor point for intra-LTE mobility (i.e. in case of handover between eNodeBs 110) and between LTE, 5G, and other 3GPP accesses. The SGW 122 is logically connected to the PGW 126.

The PGW 126 is the point of interconnect for routing packets between the EPC 120 and external packet data networks (e.g., Internet Protocol (IP) networks) 330. The PGW also performs various functions such as IP address/IP prefix allocation, policy control and charging, and other functions.

The MME 124 and HSS 128 handle user signaling or control plane (CP) functions; they process signaling related to mobility and security for network access by UE 105. The MME 124 is responsible for the tracking and the paging of UE 105 in idle-mode. It is the termination point of the Non-Access Stratum (NAS). The HSS 128 comprises a database that contains user-related and subscriber-related information, and provides support functions in mobility management, call and session setup, user authentication, access authorization, and other functions. It is noted that the SGW 122 may also be used to handle some control plane signaling in various configurations.

As depicted in FIG. 1, a Spectrum Access System (SAS) 140 communicates with the EPC 120 via a domain proxy 180 and is configured to control access to the CBRS frequency band for RANs and other CBSD devices such as network nodes 110, UE 105, and other devices. Generally speaking, the SAS 140 is configured to ensure that the CBRS frequency band is allocated for CBSD use, and that such use is adapted in accordance with government requirements, network congestion, network interference and the like.

As depicted in FIG. 1, the domain proxy 180 comprises a Universal Domain Proxy (UDP) 180-UDP, a domain proxy adaptor library 180-AL, and one or more deployed interface adaptors 180-LA, 180-LB as needed to support currently connected CBSDs such as network nodes, base stations and the like. Further, a database 181 may be included within the domain proxy 180 or be otherwise accessible to the domain proxy 180, where the database 180 may be used to store some or all of the domain proxy adaptor library 180-AL, source/vendor/manufacturer related information for identifying CBSDs and/or the relevant source-specific interface adaptors, message traffic between the SAS and CBSDs, management data derived using such message traffic (e.g., indications of congestion, loading, over utilization, under utilization, and so on) as other data as discussed herein with respect to the various embodiments.

In various embodiments, the domain proxy adaptor library 180-AL comprises a suite of adaptors for meeting the needs of a diverse group of CBSD devices (e.g., CBSD devices such as base stations/eNBs, or customer premises equipment, from different manufacturers, of differing capability, and generally with different management/communication interface requirements) which may require access to the SAS 140. In various embodiments, the domain proxy adaptor library 180-AL further includes a number of primitives useful in building and/or supporting domain proxy adaptors such as for new or future CBSD devices.

It is noted that the domain proxy 180 is depicted in logical communication with CBSD network nodes 110 within the access network 101, either directly such as via an internet connection, or via backhaul operations such as through the EPC 120.

It is noted that network nodes 110-11 and 110-12 are from a first source, vendor or manufacturer (and communicating with the domain proxy 180 via a corresponding first vendor adaptor 180-LA), network nodes 110-21 and 110-22 are from a second source, vendor or manufacturer (and communicating with the domain proxy 180 via a corresponding second vendor adaptor 180-LB), and a network node 110-31 is from a third source, vendor or manufacturer (and communicating directly with the domain proxy 180). More or fewer network nodes 110 may be deployed, and those network nodes 110 may be from more or fewer sources, vendors, or manufacturers. Generally speaking, each of the sources, vendors, or manufacturers provide CBSD equipment conforming to respective design and/or operating criteria such that each vendor may require a unique domain proxy to facilitate communications with the SAS 140.

The UDP 180-UDP enables any type of CBSD network node (e.g., base station) to communicate with the SAS and otherwise support SAS allocation, CBSD use, and NMS management of spectrum associated with deployed CBSD network nodes 110 such as in the access network 101 or other networks, groups, or domains (not shown). For example, the UDP 180-UDP provides message translation between CBSD network nodes 110 and SAS 140 messages/commands/requests, directive processing, interference contribution reporting, and the like. Generally speaking, the UDP 180-UDP provide all of the various domain proxy functions associated with enabling one or groups or networks or domains of CBSD equipment to receive frequency allocations within unlicensed but managed spectral regions such as the CBRS spectral region. Further, UDP 180-UDP provide these domain proxy functions even in the case of heterogeneous groups or networks or domains of CBSD equipment; namely, where CBSD equipment is provided by diverse/multiple sources (e.g., different vendors, different manufacturers, different models and the like) where each of the multiple sources is normally associated with a respective source-specific domain proxy and a respective domain proxy operation and maintenance (O&M) system, both of which are typically procured from the source of the CBSD equipment by a network operator.

Further embodiments provide a unified operator-wide SAS operations and maintenance (O&M) service 190, such as within or associated with a network management system (NMS) 150 configured to manage at least portions of the access network 101, EPC 120 and other provider equipment elements used to support the network services architecture 100 of FIG. 1.

In various embodiments, the NMS 150 is configured to optimize one or more managed operator networks while adhering to and complying with FCC SAS rules, such as load balancing among the CBSDs with in the access network 101 or other operator networks, triggering admission control aspects as needed such as in accordance with operator policies while taking into consideration available spectrum and quality of spectrum. In various embodiments, the NMS 150 and/or other management entities may be utilized to implement the domain proxy functions, unified SAS O&M functions, and/or other features/functions such as described herein.

In various embodiments, the unified SAS O&M 190 is configured to enable a network operator having one or more heterogeneous CBSD deployments to manage such deployments in a unified manner without the need for source-specific O&M services such that a unified operator wide SAS O&M capability is provided.

In various embodiments, the unified operator-wide SAS O&M 190 is configured to manage a singular SAS 140 or a plurality of SASs, depicted in FIG. 1 as SASs 140-1 through 140-M (collectively SASs 140), each SAS being configured to communicate with base stations via the domain proxy 180. In these embodiments, network management systems and the like may select any of the SASs or any combination among a possible multitude of available SASs 140 for managing portions of the access network 101 as appropriate to optimize for cost, backhaul bandwidth, performance, features parity with CBSDs, spectrum allocation/availability, and/or various other network management considerations. The SASs 140 may be geographically disparate, may be configured to address different portions of the network 101, may be configured to provide redundancy and/or resiliency to the SAS 140 function, and so on.

Various elements or portions thereof depicted in FIG. 1 and having functions described herein are implemented at least in part as computing devices having communications capabilities, including for example the UE 105, network nodes 110, SAS 140, universal domain proxy 180, unified operator-wide SAS O&M 190, and various portions of the EPC 120. These elements or portions thereof are implemented or instantiated via computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

For example, various embodiments are implemented using network equipment used to support network operation/management functions at a network core or elsewhere in a provider network, the network equipment comprising processing resources (e.g., one or more servers, processors, and/or virtualized processing elements or compute resources) and non-transitory memory resources (e.g., one or more servers, storage devices, memories and/or virtualized memory or storage resources), wherein the processing resources are configured to execute software instructions stored in the non-transitory memory resources to provide thereby various functions, features, methods, management entities, and other embodiments or portions thereof as described herein.

The network equipment may also be used to provide some or all of the various other core network nodes or functions described herein.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Figure 2:
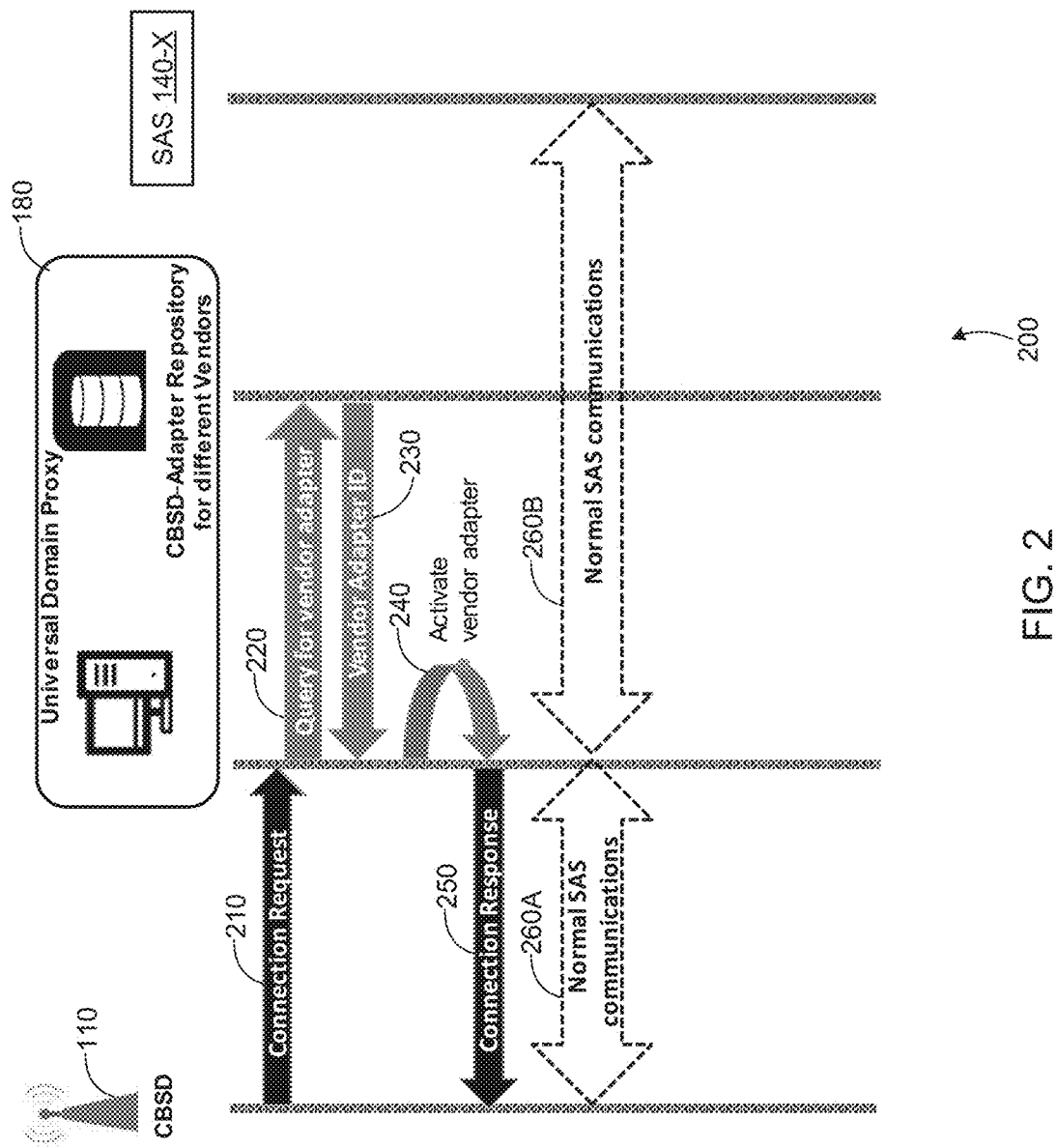
FIGS. 2-3 depicts flow diagrams of methods according to various embodiments.
Figure 3:
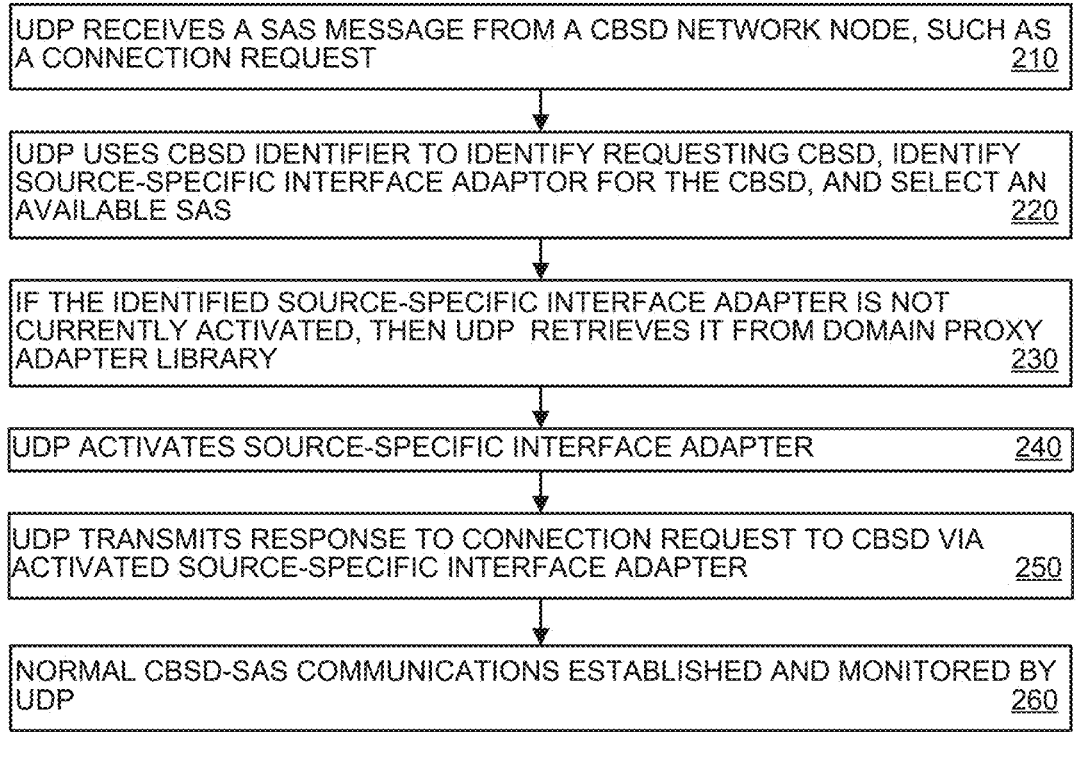
Figure 3:
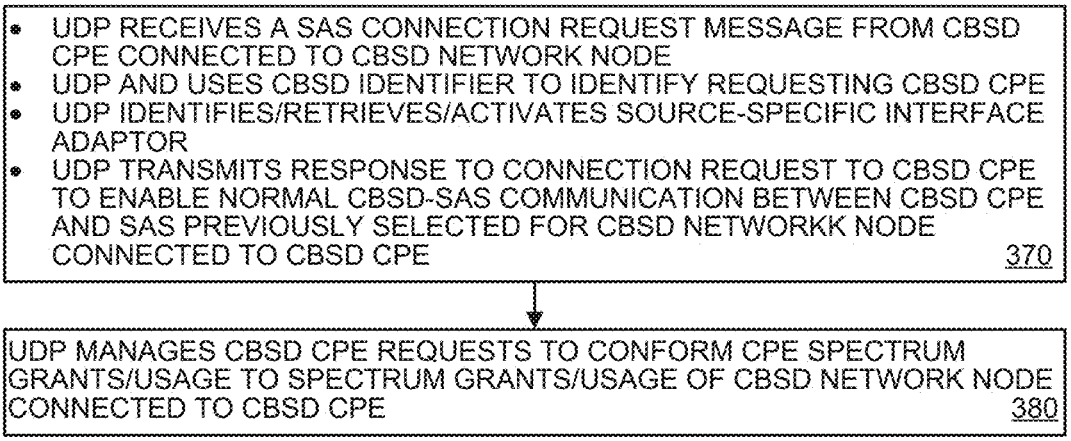

FIGS. 2-3 depicts flow diagrams of methods according to various embodiments. Specifically, FIG. 2-3 depict flow diagrams by which a universal domain proxy 180-UDP according to various embodiments supports communications between CBSD network nodes (e.g., base stations, eNBs, WAPs, etc.) within a heterogeneous or diverse source deployment of CBSD network nodes 110, CPE 107, and SAS 140. FIG. 3 further depicts embodiments directed to CBSD CBE management.

At step 210, a CBSD network node 110 transmits a SAS message to the universal domain proxy 180-UDP, illustratively a connection request or a request for allocation of a portion of a frequency band to support communication at the CBSD with proximate user equipment (UE). For example, referring to FIG. 1, CBSD 110-11 is depicted as communicating directly with UE 105a, and indirectly (via CPE 107) with UE 105b and 105c.

The SAS message further includes a source identifier sufficient to identify the source, vendor, or manufacturer of the CBSD. The source identifier may comprise a Federal Communications Commission identification (FCC-ID), a manufacturer identification, a vendor identification, and a model number, and/or other identification.

At step 220, the source identifier is used by the domain proxy to identify the vendor or manufacturer or type of CBSD network node that transmitted the SAS message, to identify the source-specific interface adaptor configured to enable domain proxy communication with this CBSD network node. This information may be determined with respect to a database 181 included within or otherwise accessible to the domain proxy, by locally stored tabulated information and the like. Further at step 220, an available SAS 140 is selected for use in managing the spectrum allocation. In various embodiments a single SAS 140 is used and always selected. In other embodiments, multiple SAS are available, and the selection of a particular SAS may be made based on various network management considerations as discussed above.

At step 230, if the identified source-specific interface adaptor is not currently activated, then the domain proxy retrieves the identified source-specific interface adaptor from a domain proxy adaptor library, a database within or accessible to the domain proxy, or other data source. The retrieved source-specific interface adaptor is then instantiated, invoked or otherwise activated.

At step 240, the domain proxy activates the source-specific interface adaptor, and at step 250 communicates a connection response to the CBSD to enable the establishment thereby of normal CBSD-SAS communications at step 260; namely, to process CBSD-SAS messages; that is, to receive SAS messages from the CBSD and forward those messages toward the SAS via an SAS interface, and to forward toward the CBSD via the corresponding source-specific interface respective messages received from the SAS via the SAS interface. Further at step 260, the domain proxy monitors message traffic between the various CBSDs and the SAS, derives relevant management data therefrom, and forwards the derived management data towards a network management system 150, unified operator-wide SAS O&M 190, or other management entity. The management data is configured to enable the management entity perform various functions, such as to re-allocate available frequencies among CBSD from different sources to accommodate incumbent frequency requirements, load sharing requirements, congestion relief/management requirements and the like.

Referring only to FIG. 3, steps 370-380 address the processing of a CBSD CPE request by the UDP. Specifically, in this embodiment it may be appropriate to allocate to a CBSD CPE a large portion of spectrum previously allocated to a connected CBSD network node, in which case the CBSD CPE should use some or all of the frequencies/channels allocated to the CBSD network node, the SAS to which the CBSD CPE communicates should be the same as the SAS communicating with the CBSD network node, and other SAS related functions associated with the CBSD CPE should be monitored and conformed to SAS related functions associated with the relevant CBSD network node.

At step 370, the UDP receives a SAS connection request from a CBSD CPE (e.g., CPE 107) connected to a CBSD network node (e.g., network node 110-11), illustratively a connection request or a request for allocation of a portion of a frequency band to support communication at the CBSD CPE with proximate user equipment (UE). For example, referring to FIG. 1, CPE 107 is depicted as communicating with UE 105b and 105c. The SAS message further includes a source identifier sufficient to identify the source, vendor, or manufacturer of the CBSD CPE. The source identifier may comprise a Federal Communications Commission identification (FCC-ID), a manufacturer identification, a vendor identification, and a model number, and/or other identification.

Further at step 370, the source identifier is used by the domain proxy to identify the vendor or manufacturer or type of CBSD CPE that transmitted the SAS message, to identify the source-specific interface adaptor configured to enable domain proxy communication with this CBSD CPE, to retrieve and activate the identified source-specific interface adaptor (if not currently activated), and to transmit a response to the connection request to the CBSD CPE so as to enable normal SAS communications with the CBSD CPE.

At step 380, the UDP manages CBSD CPE requests so as to conform CBAS CPE spectrum grants/usage to that associated with the CBSD network node connected to the CBSD CPE.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method, comprising:
receiving, at a domain proxy, a Citizens Broadband Radio Service Device (CBSD) message intended for a spectrum access server (SAS) and including a source identification associated with a requesting CBSD from a diverse group of CBSDs;
identifying, using the source identification, a source-specific interface adaptor configured for enabling the domain proxy to support communications between the requesting CBSD and the SAS;
retrieving the identified source-specific interface adaptor from a domain proxy adaptor library associated with the domain proxy;
instantiating, at the domain proxy, the retrieved source-specific interface adaptor; and
forwarding toward the SAS, from the domain proxy, the received CBSD message.

2. The method of claim 1, wherein the domain proxy adaptor library comprises a plurality of source-specific interface adaptors, each source-specific interface adaptor formed using a respective group of functions from the domain proxy adaptor library, each source-specific interface adaptor being configured to cooperate with the domain proxy to provide thereby a source-specific domain proxy function supporting connectivity between the SAS and CBSDs of a specific source.

3. The method of claim 1, wherein the source identification comprises Federal Communications Commission identification (FCC-ID).

4. The method of claim 1, wherein the source identification comprises at least one of a manufacturer identification, a vendor identification, and a CBSD model number.

5. The method of claim 1, further comprising:
determining whether the identified source-specific interface is currently instantiated; and
in response to the identified source-specific interface not being currently instantiated retrieving and instantiating the identified source-specific interface adaptor.

6. The method of claim 1, further comprising:
receiving, at the domain proxy, an SAS message intended for a CBSD; and
forwarding toward the CBSD, from the source-specific interface adaptor of the domain proxy, the received SAS message.

7. The method of claim 1, wherein the CBSD message comprises a request for allocation of a portion of a frequency band to support communication at the CBSD with proximate user equipment (UE).

8. The method of claim 1, wherein the domain proxy receives CBSD requests intended for the SAS from each of a plurality of Citizens Broadband Radio Service Devices (CBSDs) within an operator network, the plurality of CBSDs including CBSDs from diverse sources.

9. The method of claim 6, wherein the CBSD message intended for the SAS comprises a request for allocation of a portion of a frequency band to support communication at the CBSD with proximate user equipment (UE), and the SAS message intended for the CBSD comprises a response to the allocation request.

10. The method of claim 9, further comprising:
monitoring, at the domain proxy, message traffic between CBSDs and the SAS; and
forwarding, toward a network management system (NMS), management data derived from the monitored message traffic.

11. The method of claim 10, wherein the management data comprises at least a current frequency allocation of each of a plurality of CBSDs operating as base stations within an operator network including CBSDs from diverse sources.

12. The method of claim 10, wherein the management data is forwarded to an SAS Universal Domain Proxy operations and maintenance (O&M) entity associated with the NMS.

13. The method of claim 12, wherein the Universal Domain Proxy O&M is configured to manage a plurality of SASs, each SAS being configured to communicate with CBSD via the domain proxy.

14. The method of claim 13, wherein the Universal Domain Proxy O&M is configured to manage a plurality of SASs, each SAS being configured to communicate with CBSDs via an integrated Universal Domain Proxy.

15. A domain proxy comprising:
a receiver configured to receive Citizens Broadband Radio Service Device (CBSD) messages intended for a spectrum access server (SAS) and including a source identification associated with a requesting CBSD;
a processor configured to identify, using the source identification, a source-specific interface adaptor configured for enabling the domain proxy to support communications between the requesting CBSD and the SAS;
the processor being further configured to retrieve, from a domain proxy adaptor library associated with the domain proxy, the identified source-specific interface adaptor, and to instantiate the retrieved source-specific interface adaptor; and
an SAS interface configured for enabling the domain proxy to communicate with the SAS.

16. The domain proxy of claim 15, wherein the source identification comprises at least one of a Federal Communications Commission identification (FCC-ID), a manufacturer identification, a vendor identification, and a CBSD model number.

17. The domain proxy of claim 15, wherein the CBSD message comprises a request for allocation of a portion of a frequency band to support communication at the CBSD with proximate user equipment (UE).

18. The domain proxy of claim 15, wherein the domain proxy receives CBSD requests intended for the SAS from each of a plurality of Citizens Broadband Radio Service Devices (CBSDs) within an operator network, the plurality of CBSDs including CBSDs from at least two sources.

19. The domain proxy of claim 15, wherein the CBSD message intended for the SAS comprises a request for allocation of a portion of a frequency band to support communication at a CBSD customer premises equipment (CPE), and a corresponding SAS message intended for the CBSD comprises a response to the allocation request.

20. The domain proxy of claim 15, wherein the processor is further configured to monitor message traffic between CBSDs and the SAS, derive therefrom management data, and forward the management data toward a network management system (NMS).

21. The domain proxy of claim 20, wherein the management data comprises at least a current frequency allocation of each of a plurality of CBSDs within an operator network including CBSDs from at least two sources.

22. The domain proxy of claim 21, wherein the management data is forwarded to an SAS operations and management (SAS O&M) entity associated with the NMS, the SAS O&M being configured to manage a plurality of SASs being configured to communicate with CBSD via the domain proxy.

23. The domain proxy of claim 21, wherein the management data is forwarded to an SAS operations and management (SAS O&M) entity associated with the NMS, the SAS O&M being configured to manage a plurality of SASs being configured to communicate with CBSD via a respective domain proxy.

24. Network provider equipment configured to communicate with elements of a mobile network to adapt radio frequency usage associated with the mobile network elements, the network provider equipment comprising compute and storage resources configured for:

receiving a Citizens Broadband Radio Service Device (CBSD) message intended for a spectrum access server (SAS) and including a source identification associated with a requesting CBSD from a diverse group of CBSDs;

identifying, using the source identification, a source-specific interface adaptor configured for enabling the domain proxy to support communications between the requesting CBSD and the SAS;

retrieving the identified source-specific interface adaptor from a domain proxy adaptor library associated with the domain proxy;

instantiating, at the domain proxy, the retrieved source-specific interface adaptor; and forwarding toward the SAS, from the domain proxy, the received CBSD message.

25. The network provider equipment of claim 24, wherein the diverse group of CBSDs comprises provider equipment (PE) normally configured to use different SAS domain proxies to provide network services using unlicensed spectrum, the PE comprising any of eNB, gNB, cellular network base station, 4G/LTE repeater, and 5G repeater.

\* \* \* \* \*